United States Patent
Berger et al.

(10) Patent No.: US 9,752,056 B2
(45) Date of Patent: Sep. 5, 2017

(54) RADIATION-CURING, WATER-DISPERSIBLE POLYURETHANE (METH)ACRYLATES

(71) Applicant: BASF SE, Ludwigshafen (DE)

(72) Inventors: Sebastian Berger, Ann Arbor, MI (US); Peter Thuery, Ludwigshafen (DE); Susanne Neumann, Speyer (DE); Tanja Becker, Altrip (DE); Axel Becker, Altrip (DE)

(73) Assignee: BASF SE, Ludwigshafen (DE)

( * ) Notice: Subject to any disclaimer, the term of this patent is extended or adjusted under 35 U.S.C. 154(b) by 35 days.

(21) Appl. No.: 14/429,456

(22) PCT Filed: Oct. 9, 2013

(86) PCT No.: PCT/EP2013/071071
§ 371 (c)(1),
(2) Date: Mar. 19, 2015

(87) PCT Pub. No.: WO2014/063920
PCT Pub. Date: May 1, 2014

(65) Prior Publication Data
US 2015/0225606 A1   Aug. 13, 2015

Related U.S. Application Data

(60) Provisional application No. 61/717,644, filed on Oct. 24, 2012.

(30) Foreign Application Priority Data

Oct. 24, 2012  (EP) .................... 12189682

(51) Int. Cl.
| | |
|---|---|
| *C09D 175/16* | (2006.01) |
| *B05D 3/06* | (2006.01) |
| *C08G 18/66* | (2006.01) |
| *C08G 18/67* | (2006.01) |
| *C08G 18/72* | (2006.01) |
| *C08G 18/75* | (2006.01) |
| *C08G 18/79* | (2006.01) |
| *C08G 18/08* | (2006.01) |
| *C08G 18/10* | (2006.01) |
| *C08G 18/22* | (2006.01) |
| *C08G 18/28* | (2006.01) |
| *C08G 18/32* | (2006.01) |
| *C08G 18/34* | (2006.01) |
| *C08G 18/42* | (2006.01) |

(52) U.S. Cl.
CPC .......... *C09D 175/16* (2013.01); *B05D 3/067* (2013.01); *C08G 18/0823* (2013.01); *C08G 18/10* (2013.01); *C08G 18/227* (2013.01); *C08G 18/283* (2013.01); *C08G 18/2865* (2013.01); *C08G 18/3206* (2013.01); *C08G 18/348* (2013.01); *C08G 18/4216* (2013.01); *C08G 18/6659* (2013.01); *C08G 18/672* (2013.01); *C08G 18/675* (2013.01); *C08G 18/722* (2013.01); *C08G 18/755* (2013.01); *C08G 18/792* (2013.01); *Y10T 428/31551* (2015.04); *Y10T 428/31591* (2015.04)

(58) Field of Classification Search
CPC .. C08G 18/10; C08G 18/672; C08G 18/3234; C08G 18/42; C08G 18/0823; C08G 18/227; C08G 18/283; C08G 18/2865; C08G 18/3206; C08G 18/348; C08G 18/4216; C08G 18/6659; C08G 18/675; C08G 18/722; C08G 18/755; C08G 18/792; B05D 3/067; C09D 175/16; Y10T 428/31551; Y10T 428/31591
USPC .......... 428/423.1, 425.1; 427/541, 551, 553; 528/44

See application file for complete search history.

(56) References Cited

U.S. PATENT DOCUMENTS

| | | |
|---|---|---|
| 4,339,566 A | 7/1982 | Rosenkranz et al. |
| 4,596,678 A | 6/1986 | Merger et al. |
| 4,596,679 A | 6/1986 | Hellbach et al. |
| 5,087,739 A | 2/1992 | Bohmholdt et al. |
| 6,521,702 B1 | 2/2003 | Weikard et al. |
| 2006/0052527 A1* | 3/2006 | Weikard ............... C08G 18/672 524/589 |
| 2008/0139691 A1 | 6/2008 | Blum et al. |
| 2008/0194775 A1* | 8/2008 | Blum ................. C08G 18/3215 525/452 |
| 2008/0300338 A1* | 12/2008 | Wagner ................ C08G 18/092 522/107 |
| 2012/0041145 A1* | 2/2012 | Sommer ............... C08F 283/01 524/839 |
| 2012/0321900 A1 | 12/2012 | Schwalm et al. |

FOREIGN PATENT DOCUMENTS

| | | |
|---|---|---|
| DE | 29 36 039 A1 | 4/1981 |
| DE | 40 10 783 A1 | 10/1991 |
| DE | 41 13 160 A1 | 10/1992 |
| DE | 195 25 489 A1 | 1/1997 |
| DE | 196 18 720 A1 | 11/1998 |

(Continued)

OTHER PUBLICATIONS

International Search Report issued Feb. 19, 2014 in PCT/EP2013/071071.

*Primary Examiner* — Thao T Tran
(74) *Attorney, Agent, or Firm* — Oblon, McClelland, Maier & Neustadt, L.L.P.

(57) ABSTRACT

The present invention describes radiation-curable, water-dispersible polyurethane acrylates which feature good grain highlighting, their use, and the method for producing them.

21 Claims, No Drawings

(56) References Cited

FOREIGN PATENT DOCUMENTS

| | | |
|---|---|---|
| DE | 197 24 199 A1 | 12/1998 |
| DE | 198 10 793 A1 | 9/1999 |
| DE | 198 26 712 A1 | 12/1999 |
| DE | 199 13 353 A1 | 9/2000 |
| DE | 199 33 012 A1 | 1/2001 |
| DE | 199 57 604 A1 | 5/2001 |
| DE | 199 57 900 A1 | 6/2001 |
| DE | 100 13 186 A1 | 9/2001 |
| DE | 100 13 187 A1 | 10/2001 |
| DE | 10 2010 003 308 A1 | 1/2011 |
| EP | 0 007 508 A2 | 2/1980 |
| EP | 0 026 313 A1 | 4/1981 |
| EP | 0 057 474 A2 | 8/1982 |
| EP | 0 098752 A2 | 1/1984 |
| EP | 0 126 299 A1 | 11/1984 |
| EP | 0 126 300 A1 | 11/1984 |
| EP | 0 355 443 A2 | 2/1990 |
| EP | 0 495 751 A1 | 7/1992 |
| EP | 0 548 669 A2 | 6/1993 |
| EP | 0 615 980 A2 | 9/1994 |
| EP | 0 694 531 A2 | 1/1996 |
| EP | 0 703 255 A1 | 3/1996 |
| EP | 1 106 633 A2 | 6/2001 |
| EP | 1 591 502 A1 | 11/2005 |
| EP | 1 914 253 A2 | 4/2008 |
| EP | 2 316 867 A1 | 5/2011 |
| WO | WO 98/33761 A1 | 8/1998 |
| WO | WO 03/035596 A2 | 5/2003 |
| WO | WO 2004/029121 A1 | 4/2004 |
| WO | WO 2004/076519 A1 | 9/2004 |
| WO | WO 2004/076520 A1 | 9/2004 |
| WO | WO 2010/063612 A1 | 6/2010 |
| WO | WO 2012/171833 A1 | 12/2012 |

* cited by examiner

RADIATION-CURING, WATER-DISPERSIBLE POLYURETHANE (METH)ACRYLATES

The present invention describes radiation-curable, water-dispersible polyurethane acrylates which feature good grain highlighting, their use, and the method for producing them.

Urethane acrylates dispersible in water are already known from, for example, EP-A 98 752 or DE-OS 2 936 039. The hydrophilicity of these known systems derives from the presence of ionic centers, more particularly of carboxylate groups or sulfonate groups, which have alkali metal cations or ammonium ions as their counterions. The amines that are often present (for the purpose of neutralization or of increase in molar mass) may bring about yellowing of the varnishes. The desired increase in molar mass, however, is necessary in order to lower the stickiness of the films.

Radiation-curable, water-emulsifiable polyurethane (meth)acrylates are known for example from EP 694531 A2, DE 19525489 A1, DE 19810793 A1, DE 19933012 A1, DE 19957604 A1, or EP 1591502 A1.

Common to all of the products obtainable from the specifications identified is that the production of the polyurethane (meth)acrylates described therein comprises reaction with at least one diamine or polyamine.

DE 10 2010 003308 describes water-emulsifiable urethane (meth)acrylates where the addition of amines with chain extension is omitted in order to reduce the yellowing.

A disadvantage of these systems is their low level of grain highlighting on wood substrates, resulting in demand for further water-dispersible urethane (meth)acrylates which exhibit good grain highlighting.

It was an object of the present invention to develop radiation-curable, water-soluble or water-dispersible urethane (meth)acrylates which exhibit good grain highlighting, high optical transparency, and, moreover, a very smooth film when dried at elevated temperatures.

This object has been achieved by means of urethane (meth)acrylate (A) substantially synthesized from
(a) at least one (cyclo)aliphatic di- and/or polyisocyanate,
(b1) at least one (cyclo)aliphatic diol having a molar mass of less than 700 g/mol,
(b2) at least one polyesterdiol having a weight-average molar mass Mw of 700 to 2000 and preferably an acid number to DIN 53240 of not more than 20 mg KOH/g,
(c) at least one compound (c) having at least one isocyanate-reactive group and at least one radically polymerizable unsaturated group,
(d) at least one compound which has at least one isocyanate-reactive group and at least one acid group,
(e) at least one base for at least partial neutralization of the acid groups of component (d), being different from components (h1) and (h2),
(f) optionally at least one monoalcohol, having precisely one hydroxyl function,
(g) optionally at least one monofunctional polyalkylene oxide polyether alcohol,
(h1) at least one amine which is substituted by one or two hydrocarbon radicals, in which the hydrocarbon radicals together have at least 12 carbon atoms, and
(h2) optionally at least one compound having at least two primary and/or secondary amino groups.

These urethane (meth)acrylates (A) are optionally mixed with at least one low molecular weight (meth)acrylate (B) which has at least two, preferably at least three, (meth)acrylate functions and an average molecular weight of up to 1000 g/mol, preferably up to 750 g/mol.

Such a mixture of (A) and (B) preferably has at least 1.0 mol, preferably at least 1.5 mol, and more preferably at least 2.0 mol of (meth)acrylate functions per kg of solids content.

On wood substrates, the urethane (meth)acrylates (A) of the invention exhibit good grain highlighting and good wet transparency and form smooth films when dried at elevated temperature. The films have a high fullness and optical transparency.

The above-described urethane (meth)acrylates (A) and mixtures thereof with (B) can be used with particular advantage as materials for coating wood and wood-containing substrates.

Component (a) comprises at least one, preferably one to four, more preferably one to three (cyclo)aliphatic di- and/or polyisocyanates.

These are monomers and/or oligomers of aliphatic or cycloaliphatic diisocyanates.

The NCO functionality of such a compound is generally at least 1.8 and may be up to 8, preferably 1.8 to 5, and more preferably 2 to 4.

The amount of isocyanate groups, calculated as NCO=42 g/mol, is generally 5 to 25 wt %.

The diisocyanates are preferably isocyanates having 4 to 20 C atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3-, or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)tricyclo[5.2.1.0$^{2,6}$]decane isomer mixtures.

Mixtures of said diisocyanates may also be present.

Particular preference is given to hexamethylene diisocyanate, 1,3-bis(isocyanatomethyl)cyclohexane, isophorone diisocyanate, and 4,4'- or 2,4'-di(isocyanatocyclohexyl)methane and very particular preference to isophorone diisocyanate and hexamethylene diisocyanate.

Isophorone diisocyanate is usually in the form of a mixture, specifically a mixture of the cis and trans isomers, generally in a ratio of about 60:40 to 80:20 (w/w), preferably in a ratio of about 70:30 to 75:25, and more preferably in a ratio of about 75:25.

Dicyclohexylmethane 4,4'-diisocyanate may likewise be in the form of a mixture of the different cis and trans isomers.

Cycloaliphatic isocyanates are those which comprise at least one cycloaliphatic ring system.

Aliphatic isocyanates are those which comprise exclusively linear or branched chains, in other words acyclic compounds.

Also contemplated are higher isocyanates, having on average more than 2 isocyanate groups. Suitable examples include triisocyanates such as triisocyanatononane.

Suitable polyisocyanates include polyisocyanates containing isocyanurate groups, uretdione diisocyanates, polyisocyanates containing biuret groups, polyisocyanates containing urethane groups or allophanate groups, polyisocyanates comprising oxadiazinetrione groups, uretonimine-modified polyisocyanates, carbodiimide, hyperbranched polyisocyanates, polyurethane-polyisocyanate prepolymers or polyurea-polyisocyanate prepolymers of linear or branched $C_4$-$C_{20}$ alkylene diisocyanates, cycloaliphatic diisocyanates having a total of 6 to 20 C atoms.

The di- and polyisocyanates which can be used preferably have an isocyanate group (calculated as NCO, molecular weight=42) content of 10 to 60 wt %, based on the di- and polyisocyanate (mixture), preferably 15 to 60 wt %, and more preferably 20 to 55 wt %.

Preference is given to aliphatic and/or cycloaliphatic di- and polyisocyanates, qualified collectively as (cyclo)aliphatic for the purposes of this specification, examples being the aliphatic and/or cycloaliphatic diisocyanates stated above, or mixtures thereof.

For the present invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, optionally, of N-unsubstituted carbamic esters, dialkyl carbonates, and other by-products recycled from the reaction process. Di- or polyisocyanates obtained in this way generally contain a very low or even unmeasurable fraction of chlorinated compounds, leading to favorable color numbers in the products.

In one embodiment of the present invention the di- and polyisocyanates (a) have a total hydrolysable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, di- and polyisocyanates (a) having a higher chlorine content can also be used.

The di- and polyisocyanates (a) may also be at least partly in blocked form.

Preference extends to
1) Polyisocyanates containing isocyanurate groups and derived from aromatic aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, tris-isocyanatoalkyl and/or tris-isocyanatocycloalkyl isocyanurates, which constitute cyclic trimers of the diisocyanates, or are mixtures with their higher homologs containing more than one isocyanurate ring. The isocyanatoisocyanurates generally have an NCO content of 10 to 30 wt %, in particular 15 to 25 wt %, and an average NCO functionality of 2.6 to 8.
2) Uretdione diisocyanates with aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The uretdione diisocyanates can be used as a sole component or in a mixture with other polyisocyanates, particularly those specified under 1).
3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18 to 22 wt % and an average NCO functionality of 2.8 to 4.5.
4) Polyisocyanates containing urethane and/or allophanate groups and having aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with mono- or polyhydric alcohols such as, for example, methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, trimethylolpropane, neopentyl glycol, pentaerythritol, 1,4-butanediol, 1,6-hexanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butanediol, 1,4-butanediol, 3-methylpentane-1,5-diol, 2-ethylhexane-1,3-diol, 2,4-diethyloctane-1,3-diol, hydroxypivalic acid neopentyl glycol ester, ditrimethylolpropane, dipentaerythritol, 2,2-bis(4-hydroxycyclohexyl)propane, 1,1-, 1,2-, 1,3-, and 1,4-cyclohexanedimethanol, 1,2-, 1,3-, or 1,4-cyclohexanediol or mixtures thereof. These polyisocyanates containing urethane and/or allophanate groups generally have an NCO content of 12 to 20 wt % and an average NCO functionality of 2.5 to 4.5.
5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.
6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.
7) Uretonimine-modified polyisocyanates.
8) Carbodiimide-modified polyisocyanates.
9) Hyperbranched polyisocyanates, of the kind known for example from DE-A1 10013186 or DE-A1 10013187.
10) Polyurethane-polyisocyanate prepolymers, from di- and/or polyisocyanates with alcohols.
11) Polyurea-polyisocyanate prepolymers.

Polyisocyanates 1) to 11) may be used in a mixture, including optionally in a mixture with diisocyanates.

In one embodiment of the present invention component (a) is a mixture of an aliphatic di- and/or polyisocyanate (a1) and a cycloaliphatic di- and/or polyisocyanate (a2). In one preferred embodiment of the present invention a component (a1) is hexamethylene 1,6-diisocyanate as diisocyanate, and/or a polyisocyanate based thereon and selected from the group consisting of isocyanurates, biurets, urethanes, and allophanates, preferably from the group consisting of isocyanurates, urethanes, and allophanates, more preferably from the group consisting of isocyanurates and allophanates; with very particular preference the polyisocyanate based on hexamethylene 1,6-diisocyanate is its isocyanurate.

In another preferred embodiment, component (a2) comprises isophorone diisocyanate as diisocyanate, and/or a polyisocyanate based thereon, more preferably isophorone diisocyanate as diisocyanate.

In one possible embodiment the polyurethanes comprise allophanate groups; the allophanate group content of such polyurethanes (calculated as $C_2N_2HO_3=101$ g/mol) is preferably 1 to 28 wt %, preferably from 3 to 25 wt %.

Component (b1) comprises at least one, preferably one to three, more preferably one to two, and very preferably precisely one (cyclo)aliphatic, more particularly aliphatic, diol, having a molar mass of less than 700 g/mol, preferably less than 600, more preferably less than 500, and very preferably less than 400 g/mol.

A cycloaliphatic diol is a reference to those diols which comprise at least one saturated ring system.

Aliphatic diols are those which comprise exclusively linear or branched chains, in other words acyclic compounds.

Examples of aliphatic diols are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, where n is an integer and n is 4, polyethylene-polypropylene glycols, where the sequence of the ethylene oxide or propylene oxide units may be blockwise or random, polytetramethylene glycols, and poly-1,3-propanediols.

Diols used with preference are ethylene glycol, 1,2-propanediol, 1,3-propanediol, 1,4-butanediol, 1,5-pentanediol, 1,6-hexanediol, and 1,8-octanediol.

Examples of cycloaliphatic diols are 1,2- and 1,3-cyclopentanediols, 1,2-, 1,3-, and 1,4-cyclohexanediols, 1,1-, 1,2-, 1,3-, and 1,4-bis(hydroxymethyl)cyclohexanes, 1,1-, 1,2-, 1,3-, and 1,4-bis(hydroxyethyl)cyclohexanes, and bis (4-hydroxycyclohexane)isopropylidene.

Preference is given to 1,2-, 1,3-, and 1,4-cyclohexanediol, 1,3- and 1,4-bis(hydroxymethyl)cyclohexane, and bis(4-hydroxycyclohexane)isopropylidene.

Preferred diols (b1) are ethylene glycol, 1,2-propanediol, 1,3-propanediol, 2,2-dimethyl-1,2-ethanediol, 2,2-dimethyl-1,3-propanediol (neopentyl glycol), 1,2-butanediol, 1,3-butanediol, 1,4-butanediol, 1,6-hexanediol, or diethylene glycol.

Particularly preferred compounds (b1) are ethylene glycol, 1,2-propanediol, 1,3-propanediol, neopentyl glycol, 1,4-butanediol, and diethylene glycol.

Especially preferred compounds (b1) are ethylene glycol, neopentyl glycol, and 1,4-butanediol.

Component (b2) comprises at least one, preferably one to three, more preferably one to two, and very preferably precisely one polyesterdiol having a weight-average molar mass Mw of 700 to 2000, preferably 750 to 1500 g/mol, preferably having an acid number to DIN 53240 of not more than 20 mg KOH/g.

Preferably this is a polyesterdiol synthesized at least partly from aliphatic diol and/or dicarboxylic acid building blocks. Polyesterdiols of this kind have a greater conformative flexibility than those synthesized exclusively from aromatic and/or cycloaliphatic building blocks.

The dicarboxylic acid building blocks may be the free acids or derivatives thereof.

By derivatives are meant preferably the relevant anhydrides in monomeric or else polymeric form, monoalkyl or dialkyl esters, preferably mono- or di-$C_1$-$C_4$ alkyl esters, more preferably monomethyl or dimethyl esters, or the corresponding monoethyl or diethyl esters, furthermore, monovinyl and divinyl esters, and also mixed esters, preferably mixed esters having different $C_1$-$C_4$ alkyl components, more preferably mixed methyl ethyl esters.

$C_1$-$C_4$ alkyl in the context of this specification denotes methyl, ethyl, isopropyl, n-propyl, n-butyl, isobutyl, sec-butyl and tert-butyl, preferably methyl, ethyl, and n-butyl, more preferably methyl and ethyl, and very preferably methyl.

Aliphatic building blocks have only open chains, preferably alkylene chains, whereas cycloaliphatic building blocks have at least one ring system apart from the functional groups. Aromatic building blocks have at least one aromatic ring system apart from the functional groups.

Examples of aliphatic diols are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycol $HO(CH[CH_3]CH_2O)_n$—H, where n is an integer and n is ≥4, polyethylene-polypropylene glycols, where the sequence of the ethylene oxide or propylene oxide units may be blockwise or random, polytetramethylene glycols, and poly-1,3-propanediols.

Diols used with preference are ethylene glycol, 1,2-propanediol, 1,3-propanediol, 1,4-butanediol, 1,5-pentanediol, 1,6-hexanediol, and 1,8-octanediol.

Examples of cycloaliphatic diols are 1,2- and 1,3-cyclopentanediols, 1,2-, 1,3-, and 1,4-cyclohexanediols, 1,1-, 1,2-, 1,3-, and 1,4-bis(hydroxymethyl)cyclohexanes, 1,1-, 1,2-, 1,3-, and 1,4-bis(hydroxyethyl)cyclohexanes, and bis (4-hydroxycyclohexane)isopropylidene.

Preference is given to 1,2-, 1,3-, and 1,4-cyclohexanediol, 1,3- and 1,4-bis(hydroxymethyl)cyclohexane, and bis(4-hydroxycyclohexane)isopropylidene.

Examples of aliphatic dicarboxylic acids are oxalic acid, malonic acid, maleic acid, fumaric acid, succinic acid, glutaric acid, adipic acid, pimelic acid, suberic acid, azelaic acid, sebacic acid, undecane-α,ω-dicarboxylic acid, dodecane-α,ω-dicarboxylic acid, and derivatives thereof.

Examples of cycloaliphatic dicarboxylic acids are cis- and trans-cyclohexane-1,2-dicarboxylic acid (hexahydrophthalic acid), cis- and trans-cyclohexane-1,3-dicarboxylic acid, cis- and trans-cyclohexane-1,4-dicarboxylic acid, 1,2-, 1,3-, or 1,4-cyclohex-4-enedicarboxylic acid (tetrahydrophthalic acids), cis- and trans-cyclopentane-1,2-dicarboxylic acid, cis- and trans-cyclopentane-1,3-dicarboxylic acid, and derivatives thereof.

Examples of aromatic dicarboxylic acids are phthalic acid, isophthalic acid, terephthalic acid, and phthalic anhydride; phthalic acid and isophthalic acid are preferred; phthalic acid is particularly preferred.

Preferred polyesterdiols (b2) are those polyesterdiols in which diol and/or dicarboxylic acid components or derivatives thereof for their preparation are at least partly aliphatic; preferably, the diol component is entirely an aliphatic component.

Component (c) comprises at least one, preferably 1 to 3, more preferably precisely one to two, and very preferably precisely one compound having at least one, one to three for example, preferably one to two, and more preferably precisely one isocyanate-reactive group and having at least one, one to five for example, preferably one to three, more preferably one or two, and very preferably precisely one radically polymerizable unsaturated group.

Isocyanate-reactive groups may be, for example, —OH, —SH, —NH$_2$, and —NHR$^5$, where R$^5$ is hydrogen or an alkyl group comprising 1 to 4 carbon atoms, such as methyl, ethyl, n-propyl, isopropyl, n-butyl, isobutyl, sec-butyl, or tert-butyl, for example.

Isocyanate-reactive groups may preferably be —OH, —NH$_2$, or —NHR$^5$, more preferably —OH or —NH$_2$, and very preferably —OH.

Components (c) may be, for example, monoesters of α,β-unsaturated carboxylic acids, such as acrylic acid, methacrylic acid, crotonic acid, itaconic acid, fumaric acid, maleic acid, acrylamido glycolic acid, methacrylamido glycolic acid, or vinyl ethers with diols or polyols which have preferably 2 to 20 C atoms and at least two hydroxy groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,2-, 1,3-, or 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, polyTHF having a molar weight of between 162 and 2000, poly-1,3-propanediol having a molar weight of between 134 and 400, or polyethylene glycol having a molar weight of between 238 and 458. It is also possible, furthermore, to use esters or amides of (meth)acrylic acid with amino alcohols, as for example 2-aminoethanol, 2-(methylamino)ethanol, 3-amino-1-propanol, 1-amino-2-propanol, or 2-(2-aminoethoxy)ethanol, 2-mercaptoethanol, or polyaminoalkanes, such as ethylene diamine or diethylenetriamine, or vinylacetic acid.

Furthermore, suitability is also possessed by unsaturated polyetherols or polyesterols or polyacrylate polyols having an average OH functionality of 2 to 10, albeit less preferably.

Examples of amides of ethylenically unsaturated carboxylic acids with amino alcohols are hydroxyalkyl(meth)acrylamides such as N-hydroxymethylacrylamide, N-hydroxymethylmethacrylamide, N-hydroxyethylacrylamide, N-hydroxyethylmethacrylamide, 5-hydroxy-3-oxa-pentyl (meth)acrylamide, N-hydroxyalkylcrotonamides such as N-hydroxymethylcrotonamide, or N-hydroxyalkylmaleimides such as N-hydroxyethylmaleimide.

Preference is given to using 2-hydroxyethyl(meth)acrylate, 2- or 3-hydroxypropyl(meth)acrylate, 1,4-butanediol mono(meth)acrylate, neopentyl glycol mono(meth)acrylate, 1,5-pentanediol mono(meth)acrylate, 1,6-hexanediol mono (meth)acrylate, glyceryl mono- and di(meth)acrylate, trimethylolpropane mono and di(meth)acrylate, pentaerythrityl mono-, -di-, and -tri(meth)acrylate, and also 4-hydroxybutyl vinyl ether, 2-aminoethyl(meth)acrylate, 2-aminopropyl (meth)acrylate, 3-aminopropyl(meth)acrylate, 4-aminobutyl (meth)acrylate, 6-aminohexyl(meth)acrylate, 2-thioethyl (meth)acrylate, 2-aminoethyl(meth)acrylamide, 2-aminopropyl(meth)acrylamide, 3-aminopropyl(meth) acrylamide, 2-hydroxyethyl(meth)acrylamide, 2-hydroxypropyl(meth)acrylamide, or 3-hydroxypropyl(meth)acrylamide. Particularly preferred are 2-hydroxyethyl acrylate, 2-hydroxyethyl methacrylate, 2- or 3-hydroxypropyl acrylate, 1,4-butanediol monoacrylate, 3-(acryloyloxy)-2-hydroxypropyl(meth)acrylate, and also the monoacrylates of polyethylene glycol with a molar mass of 106 to 238.

In one preferred embodiment component (c) is selected from the group consisting of 2-hydroxyethyl acrylate, 2-hydroxyethyl methacrylate, 2- or 3-hydroxypropyl acrylate, and 1,4-butanediol monoacrylate, glyceryl 1,2- or 1,3-diacrylate, trimethylolpropane diacrylate, pentaerythrityl triacrylate, ditrimethylolpropane triacrylate, and dipentaerythrityl pentaacrylate, preferably of 2-hydroxyethyl acrylate and 2-hydroxyethyl methacrylate, and more preferably from 2-hydroxyethyl acrylate.

Where component (c) comprises technical mixtures from the acrylization of trimethylolpropane, pentaerythritol, ditrimethylolpropane, or dipentaerythritol, these mixtures are usually used as mixtures of fully and incompletely acrylicized polyols. Very particularly preferred in that case as compounds (c) are technical mixtures from the acrylization of pentaerythritol that usually have an OH number to DIN 53240 of 99 to 115 mg KOH/g and consist predominantly of pentaerythrityl triacrylate and pentaerythrityl tetraacrylate, and may also comprise minor amounts of pentaerythrityl diacrylate. This has the advantage that pentaerythrityl tetraacrylate is not incorporated into the polyurethane (A) of the invention, but instead functions simultaneously as reactive diluent (B).

In another preferred embodiment component (c) comprises at least one, preferably 1 to 2, more preferably precisely one epoxy(meth)acrylate having at least two, two for four for example, preferably two to three, and more preferably precisely two hydroxyl functions and the same number of (meth)acrylate functions.

Epoxy(meth)acrylates are obtainable by reacting an epoxide group with (meth)acrylic acid to form a β-hydroxyalkyl (meth)acrylate group.

Compounds (c) are preferably reaction products of glycidyl ethers with (meth)acrylic acid.

Those contemplated are, for example, glycidyl ethers of aliphatic or aromatic polyols. Products of this kind are available commercially in large numbers. Particularly preferred are polyglycidyl compounds of the bisphenol A, F, or B type, their fully hydrogenated derivatives, and glycidyl ethers of polyhydric alcohols, as for example of 1,4-butanediol, 1,4-cyclohexanedimethanol, and neopentyl glycol, of 1,6-hexanediol, of glycerol, trimethylolpropane, and of pentaerythrityl. Examples of polyepoxide compounds of these kinds are Epikote® 812 (epoxide value: about 0.67 mol/100 g) and Epikote® 828 (epoxide value: about 0.53 mol/100 g), Epikote® 1001, Epikote® 1007, and Epikote® 162 (epoxide value: about 0.61 mol/100 g) from Resolution Performance Products, Rütapox® 0162 (epoxide value: about 0.58 mol/100 g), and Araldit® DY 0397 (epoxide value: about 0.83 mol/100 g) from Vantico AG.

Particularly preferred are bisphenol A diglycidyl ether and 1,4-butanediol diglycidyl ether, very preferably bisphenol A diglycidyl ether.

The compound (c) is more particularly an epoxy(meth)acrylate of the formula

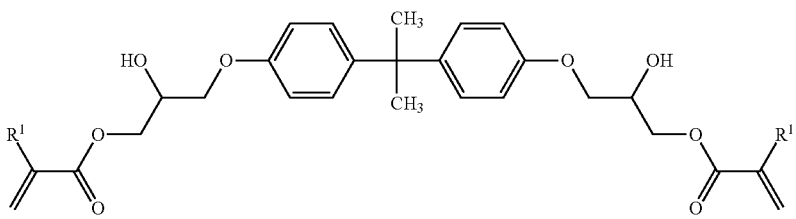

in which
$R^1$ is hydrogen or methyl, preferably hydrogen.

Component (d) is at least one, preferably precisely one, compound which has at least one, one or two for example, preferably precisely two isocyanate-reactive groups and at least one acid group.

By acid groups here are meant carboxylic acid, sulfonic acid, or phosphonic acid groups, preferably carboxylic acid or sulfonic acid groups, and more preferably carboxylic acid groups.

Compounds (d) comprise precisely one isocyanate-reactive group, and at least one hydrophilic group which is anionic or can be converted into an anionic group. Examples of the compounds in question are those as described in EP-A1 703 255, particularly from page 3 line 54 to page 4 line 38 therein, in DE-A1 197 24 199, particularly from page 3 line 4 to line 30 therein, in DE-A1 40 10 783, particularly from column 3 line 3 to line 40 therein, in DE-A1 41 13 160, particularly from column 3 line 63 to column 4 line 4 therein, and in EP-A2 548 669, particularly from page 4 line 50 to page 5 line 6 therein. These documents are hereby expressly incorporated by reference as part of the present disclosure content.

Possible compounds (d) are those having the general formula

RG-R³-DG

in which
RG is at least one isocyanate-reactive group,
DG is at least one dispersive group, and
$R^3$ is an aliphatic, cycloaliphatic, or aromatic radical comprising 1 to 20 carbon atoms.

Examples of isocyanate-reactive groups RG are —OH, —SH, —NH$_2$, or —NHR$^5$, wherein R$^5$ has the definition recited above, but can be different from the radical used there; preferably —OH, —NH$_2$, or —NHR$^5$, more preferably —OH or —NH$_2$, and very preferably —OH.

Examples of DG are —COOH, —SO$_3$H, or —POSH and also their anionic forms, with which any desired counterion may be associated, for example, Li$^+$, Na$^+$, K$^+$, Cs$^+$, Mg$^{2+}$, Ca$^{2+}$, or Ba$^{2+}$. As associated counterion it is additionally possible to have quaternary ammonium ions or ammonium ions derived from ammonia or amines, especially tertiary amines, such as, for example, ammonium, methylammonium, dimethylammonium, trimethylammonium, ethylammonium, diethylammonium, triethylammonium, tributylammonium, diisopropylethylammonium, benzyldimethylammonium, monoethanolammonium, diethanolammonium, triethanolammonium, hydroxyethyldimethylammonium, hydroxyethyldiethylammonium, monopropanolammonium, dipropanolammonium, tripropanolammonium, piperidinium, piperazinium, N,N'-dimethylpiperazinium, morpholinium, pyridinium, tetramethylammonium, triethylmethylammonium, 2-hydroxyethyltrimethylammonium, bis(2-hydroxyethyl)dimethylammonium, and tris(2-hydroxyethyl)methylammonium.

$R^3$ is preferably methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene, or 1,4-cyclohexylene.

Such components (d) are, for example, hydroxyacetic acid, tartaric acid, lactic acid, 3-hydroxypropionic acid, hydroxypivalic acid, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxysuccinic acid, hydroxydecanoic acid, ethylenediaminetriacetic acid, hydroxydodecanoic acid, hydroxyhexadecanoic acid, 12-hydroxystearic acid, am inonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-alkylated or N-cycloalkylated aminopropanesulfonic or aminoethanesulfonic acids, examples being N-cyclohexylaminoethanesulfonic acid or N-cyclohexylaminopropanesulfonic acid, and also their alkali metal, alkaline earth metal or ammonium salts, and with particular preference the stated monohydroxycarboxylic and monohydroxysulfonic acids, and also monoaminocarboxylic and monoaminosulfonic acids.

For preparing the dispersion, the aforementioned acids, if not already in salt form, are fully or partly neutralized, preferably with alkali metal salts or amines, preferably tertiary amines.

The compound (d) is preferably a compound having precisely two hydroxyl groups and precisely one acid group, preferably precisely one carboxylic acid group.

Examples of such acid groups are dimethylolpropionic acid, dimethylolbutyric acid, and dimethylolpentanoic acid, with dimethylolpropionic acid and dimethylolbutyric acid being preferred; a particularly preferred compound (d) is dimethylolpropionic acid.

Component (e) comprises at least one base, which is different from components (h1) and (h2), for at least partial neutralization of the acid groups of component (d).

Basic compounds (e) contemplated include inorganic and organic bases such as ammonium, alkali metal, and alkaline earth metal hydroxides, oxides, carbonates, hydrogen carbonates, and also ammonia or tertiary amines, preferably alkali metal hydroxides. Particular preference is given to partial neutralization with sodium hydroxide or potassium hydroxide. The amounts of chemically bonded acid groups introduced, and the extent of the neutralization of the acid groups (usually amounting to 40 to 80 mol % of the equivalence basis), or preferably to be sufficient to ensure dispersing of the polyurethanes in an aqueous medium, as is familiar to the skilled person.

Preferably, however, compound (e) comprises amines, more preferably tertiary amines, examples being trimethylamine, triethylamine, tributylamine, diisopropylethylamine, benzyldimethylamine, triethanolamine, dimethylethanolamine, diethylethanolamine, methyldiethanolamine, ethyldiethanolamine, and tripropanolamine.

It is preferred for 50 to 80 mol % of the acid groups from (d) to be neutralized. This brings about a monomodal size distribution of the dispersed particles, and raises the stability of the dispersion.

The optional component (f) comprises at least one monoalcohol, which has precisely one hydroxy function and, furthermore, has no other functional group.

The compounds in question are preferably monools, more preferably alkanols, and very preferably alkanols having 1 to 20, preferably 1 to 12, more preferably 1 to 6, very preferably 1 to 4, and more particularly 1 to 2 carbon atoms.

Examples thereof are methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, cyclopentanol, cyclohexanol, cyclooctanol, cyclododecanol, ethylene glycol monomethyl ether, ethylene glycol monoethyl ether, diethylene glycol, 1,3-propanediol monomethyl ether; preferably methanol, ethanol, isopropanol, n-propanol, n-butanol, tert-butanol, n-hexanol, 2-ethylhexanol, cyclopentanol, cyclohexanol, and cyclododecanol, more preferably methanol, ethanol, isopropanol, n-propanol, n-butanol, and tert-butanol, very preferably methanol and ethanol, and more particularly methanol.

In one preferred embodiment the monools may be the stated cycloaliphatic alcohols, preferably cyclopentanol or cyclohexanol, more preferably cyclohexanol.

In another preferred embodiment the monools may be the stated aliphatic alcohols having 6 to 20 carbon atoms, more preferably those having 8 to 20 carbon atoms, very preferably those having 10 to 20 carbon atoms.

In one particularly preferred embodiment the monools are the stated aliphatic alcohols, very preferably those with 1 to 4 carbon atoms, more preferably methanol.

The function of the compounds (f) is to satisfy any remaining, unreacted isocyanate groups in the preparation of the urethane (meth)acrylates (A).

The optional compound (g) comprises at least one monofunctional polyalkylene oxide polyether alcohol, of the kind obtainable by alkoxylation of suitable starter molecules.

Suitable starter molecules for preparing such polyalkylene oxide polyether alcohols are thiol compounds, monohydroxy compounds of the general formula $R^{18}$—O—H or secondary monoamines of the general formula $R^{16}R^{17}N$—H, in which
$R^{16}$, $R^{17}$, and $R^{18}$ independently of one another are independently of one another each $C_1$-$C_{18}$ alkyl, $C_2$-$C_{18}$ alkyl optionally interrupted by one or more oxygen and/or sulfur atoms and/or by one or more substituted or unsubstituted imino groups, or are $C_6$-$C_{12}$ aryl, $C_5$-$C_{12}$ cycloalkyl, or a five- to six-membered heterocycle containing oxygen, nitrogen and/or sulfur atoms, or $R^{16}$ and $R^{17}$ together form an unsaturated, saturated, or aromatic ring which is optionally interrupted by one or more oxygen and/or sulfur atoms and/or by one or more substituted or unsubstituted imino groups, and the stated radicals may in each case be substituted by functional groups, aryl, alkyl, aryloxy, alkyloxy, halogen, heteroatoms and/or heterocycles.

Preferably, $R^{16}$, $R^{17}$, and $R^{18}$ independently of one another are $C_1$ to $C_4$ alkyl; more preferably $R^{16}$, $R^{17}$, and $R^{18}$ are methyl.

Monofunctional starter molecules suitable by way of example may be saturated monoalcohols—that is, monoalcohols not comprising any double or triple C—C- or C-heteroatom bonds—such as methanol, ethanol, n-propanol, isopropanol, n-butanol, isobutanol, sec-butanol, the isomeric pentanols, hexanols, octanols, and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; aromatic alcohols such as phenol, the isomeric cresols, or methoxyphenols, araliphatic alcohols such as benzyl alcohol, anisyl alcohol, or cinnanyl alcohol; secondary monoamines such as dimethylamine, diethylamine, dipropylamine, diisopropylamine, di-n-butylamine, diisobutylamine, bis(2-ethylhexyl)amine, N-methyl- and N-ethylcyclohexylamine, or dicyclohexylamine, heterocyclic secondary amines such as morpholine, pyrrolidine, piperidine, or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol, or 1-(dimethylamino)-2-propanol.

Preferred starter molecules are alcohols having not more than 6 carbon atoms, more preferably not more than 4 carbon atoms, very preferably not more than 2 carbon atoms, and more particularly methanol.

Alkylene oxides suitable for the alkoxylation reaction are ethylene oxide, propylene oxide, isobutylene oxide, vinyloxirane and/or styrene oxide, which may be used in any order (for preparing block copolymers) or else in a mixture (for preparing random copolymers) in the alkoxylation reaction.

Preferred alkylene oxides are ethylene oxide, propylene oxide, and mixtures thereof; ethylene oxide is particularly preferred.

Preferred polyether alcohols are those based on polyalkylene oxide polyether alcohols prepared using saturated aliphatic or cycloaliphatic alcohols of the abovementioned kind as starter molecules. Very particular preference is given to those based on polyalkylene oxide polyether alcohols prepared using saturated aliphatic alcohols having 1 to 4 carbon atoms in the alkyl radical. Especially preferred are polyalkylene oxide polyether alcohols prepared starting from methanol.

The monohydric polyalkylene oxide polyether alcohols have on average, generally speaking, at least 2 alkylene oxide units, preferably 5 ethylene oxide units, per molecule, in copolymerized form, more preferably at least 7, and very preferably at least 10.

The monohydric polyalkylene oxide polyether alcohols have on average, generally speaking, up to 90 alkylene oxide units, preferably ethylene oxide units, per molecule, in copolymerized form, preferably up to 45, more preferably up to 40, and very preferably up to 30.

The molar weight of the monohydric polyalkylene oxide polyether alcohols is preferably up to 4000, more preferably not above 2000 g/mol, very preferably not below 500, more particularly 1000±500 g/mol, and especially 500 to 1000 g/mol.

Preferred polyether alcohols are therefore compounds of the formula

in which
$R^{18}$ is as defined above,
s is an integer from 2 to 90, preferably 5 to 45, more preferably 7 to 40, and very preferably 10 to 30, and
each $X_i$ for i=1 to s independently of one another may be selected from the group consisting
of —$CH_2$—$CH_2$—O—, —$CH_2$—$CH(CH_3)$—O—, —CH($CH_3$)—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—$CH(CH_3)$—O—, and —CH($CH_3$)—$CH_2$—O—, and more preferably —$CH_2$—$CH_2$—O—
in which Ph is phenyl and Vin is vinyl.

The compound (h1) comprises at least one, preferably precisely one, amine which is substituted by one or two hydrocarbon radicals, and in which the hydrocarbon radicals together have at least 12, preferably at least 14, more preferably at least 16, very preferably at least 20, and more particularly at least 24 carbon atoms.

The hydrocarbon radicals may be alkyl, aryl, or cycloalkyl radicals, preferably alkyl or cycloalkyl, and more preferably alkyl.

The alkyl radicals are optionally alkyl- or cycloalkyl-substituted, preferably unsubstituted $C_1$-$C_{20}$ alkyl, as for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, undecyl, dodecyl, tridecyl, tetradecyl, pentadecyl, hexadecyl, heptadecyl, octadecyl, or eicosyl, preferably octyl, decyl, undecyl, dodecyl, tridecyl, tetradecyl, pentadecyl, hexadecyl, heptadecyl, octadecyl, or eicosyl, more preferably dodecyl, tridecyl, tetradecyl, pentadecyl, hexadecyl, heptadecyl, octadecyl, or eicosyl.

In one preferred embodiment, in the case of disubstituted amines, particularly in the case of dialkylamines, both hydrocarbon radicals or alkyl radicals of the compound (h1), in each case independently of one another, comprise at least six, preferably at least eight, more preferably at least ten, and very preferably at least twelve carbon atoms.

Examples of compounds (h1) are di-n-hexylamine, dicyclohexylamine, diphenylamine, phenylcyclohexylamine, phenylbenzylamine, dibenzylamine, benzylphenethylamine, bis(1-phenylethyl)amine, N-benzyl-1-phenylethylamine, di-n-octylamine, bis-2-ethylhexylamine, didecylamine, diundecylamine, monododecylamine, didodecylamine, monotridecylamine, monohexadecylamine (cetylamine), monooctadecylamine (stearylamine), and ditridecylamine.

The compound (h2) comprises at least one, preferably one to three, more preferably one to two, and very preferably precisely one compound having at least two, preferably two to three, and more preferably precisely two primary amino groups.

Compounds having 2 primary amino groups are, for example, $C_1$-$C_{20}$ alkylenediamines such as ethylenediamine, 1,4-butylenediamine, 1,5-pentanediamine, neopentanediamine, or hexamethylenediamine.

Additionally mentioned may be 4,9-dioxadodecane-1,12-diamine, 4,7,10-trioxatridecane-1,13-diamine, 4,4'-diaminodicyclohexylmethane, and isophoronediamine.

Also conceivable are compounds having primary and secondary amino groups, for example, 3-amino-1-methylaminopropane, diethylenetriamine, triethylenetetramine, dipropylenetriamine, and N,N'-bis(3-aminopropyl)ethylenediamine.

In this case, diamines or polyamines have the effect of increasing molar mass, which reduces the stickiness of the resultant coatings.

It is conceivable to mix urethane (meth)acrylate (A) with at least one low molecular weight (meth)acrylate (B) preferably taking place as early as during the preparation of the urethane (meth)acrylate (A) in the presence of at least one low molecular mass (meth)acrylate (B).

The low molecular mass (meth)acrylate (B) is at least one radiation-curable compound which besides radically polymerizable acrylate or methacrylate groups, preferably acrylate groups, comprises no isocyanate-group-reactive or hydroxy-group-reactive groups and, moreover, has a low viscosity, preferably of less than 150 mPas (in this specification, the viscosity is reported at 25° C. in accordance with DIN EN ISO 3219/A.3 in a cone/plate system with a shear rate of 1000 $s^{-1}$, unless otherwise noted).

The compound (B) has an average molecular weight of up to 1000, preferably up to 750 g/mol. It is preferably a polyether(meth)acrylate or a (meth)acrylate of a di-, tri-, or tetraol.

Preferred compounds (B) have at least two, more preferably at least three (meth)acrylate groups.

Generally speaking, the compounds (B) have up to six, preferably up to four (meth)acrylate groups.

Particularly preferred compounds (B) have a boiling point of more than 200° C. under atmospheric pressure.

The compounds (B) may be, for example, reactive diluents, of the kind described generally in P. K. T. Oldring (editor), Chemistry & Technology of UV & EB Formulations for Coatings, Inks & Paints, Vol. II, Chapter III: Reactive Diluents for UV & EB Curable Formulations, Wiley and SITA Technology, London 1997.

Examples of multifunctional polymerizable compounds are ethylene glycol diacrylate 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, and 1,4-cyclohexanedimethanol diacrylate, 1,2-, 1,3-, or 1,4-cyclohexanediol diacrylate, dipropylene glycol diacrylate, tripropylene glycol diacrylate, trimethylolpropane triacrylate, ditrimethylolpropane tetraacrylate, dipentaerythrityl penta- or hexaacrylate, pentaerythritol tri- or tetraacrylate, glyceryl di- or triacrylate, and also di- and polyacrylates of sugar alcohols, such as, for example, sorbitol, mannitol, diglycerol, threitol, erythritol, adonitol (ribitol), arabitol (lyxitol), xylitol, dulcitol (galactitol), maltitol, or isomalt, or of polyester polyols, polyetherols, polyTHF having a molar mass of between 162 and 2000, poly-1,3-propanediol having a molar mass of between 134 and 1178, polyethylene glycol having a molar mass of between 106 and 898, and also epoxy(meth)acrylates, polyester(meth)acrylates, polyether(meth)acrylates, urethane (meth)acrylates, or polycarbonate(meth)acrylates, which optionally may also have been modified with one or more amines.

Further examples are (meth)acrylates of compounds of the formula (VIIIa) to (VIIId),

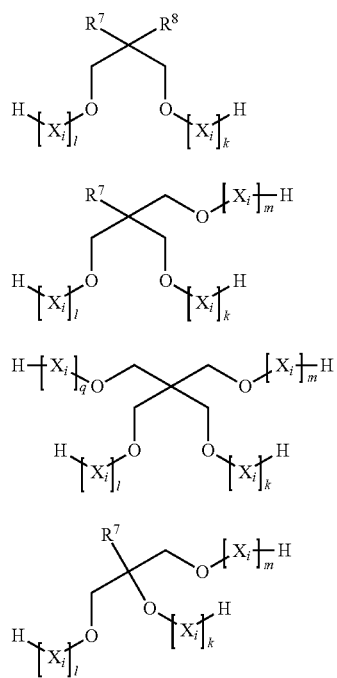

in which
R$^7$ and R$^8$ independently of one another are hydrogen or optionally aryl-, alkyl-, aryloxy-, alkyloxy-, heteroatom- and/or heterocycle-substituted C$_1$-C$_{18}$ alkyl,
k, l, m, q independently of one another are each an integer from 1 to 10, preferably 1 to 5, and more preferably 1 to 3, and
each X$_i$ for i=1 to k, 1 to l, 1 to m, and 1 to q may be selected independently of one another from the group —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O—, and —CHPh-CH$_2$—O—, preferably from the group —CH$_2$—CH$_2$—O—, —CH$_2$—CH(CH$_3$)—O—, and —CH(CH$_3$)—CH$_2$—O—, and more preferably —CH$_2$—CH$_2$—O—,
in which Ph is phenyl and Vin is vinyl.

In these compounds, optionally aryl-, alkyl-, aryloxy-, alkyloxy-, heteroatom- and/or heterocycle-substituted C$_1$-C$_{18}$ alkyl is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, preferably methyl, ethyl, or n-propyl, very preferably methyl or ethyl.

Preferably these are (meth)acrylates of singly to vigintuply and more preferably triply to decuply ethoxylated, propoxylated, or mixedly ethoxylated and propoxylated, and more particularly exclusively ethoxylated, neopentyl glycol, trimethylolpropane, trimethylolethane, or pentaerythritol.

Preferred multifunctional, polymerizable compounds are 1,2-propanediol diacrylate, 1,3-propanediol diacrylate, dipropylene glycol diacrylate, tripropylene glycol diacrylate, trimethylolpropane triacrylate, ditrimethylol tetracrylate, and dipentaerythritol hexaacrylate, polyester polyol acrylates, polyetherol acrylates, and triacrylate of singly to vigintuply alkoxylated, more preferably singly to 20 ply ethoxylated trimethylolpropane, singly to 20 ply propoxylated glycerol, or singly to 20 ply ethoxylated and/or propoxylated pentaerythritol.

Especially preferred multifunctional polymerizable compounds are trimethylolpropane triacrylate and triacrylate of singly to vigintuply ethoxylated trimethylolpropane, triacrylate of singly to 20 ply propoxylated glycerol, or tetraacrylate of singly to 20 ply ethoxylated and/or propoxylated pentaerythritol.

The composition of the urethane (meth)acrylates (A) is, generally speaking, as follows:
(a) 100 mol % of isocyanate functions in the sum total of (a1) and (a2),
(b) 5 to 35 mol % of hydroxyl functions in the sum total of (b1) and (b2) (based on isocyanate functions in (a)), preferably 15 to 35 mol %,
(c) 20 to 60 mol % of hydroxyl functions (based on isocyanate functions in (a)), preferably 30 to 50 mol %,
(d) 10 to 30 mol % of hydroxyl functions (based on isocyanate functions in (a)), preferably 15 to 25 mol %,
(e) 40 to 80 mol % of base (based on acid functions in (d)), preferably 55 to 80 mol %,
(f) 0 to 10 mol %, preferably 0 to 5 mol %, more preferably 0 mol % of hydroxyl functions (based on isocyanate functions in (a)),
(g) 0 to 10 mol %, preferably 0 to 5 mol % of hydroxyl functions (based on isocyanate functions in (a)),
(h1) 1 to 20 mol %, preferably 1 to 10 mol % of secondary amino functions (based on isocyanate functions in (a)),
(h2) 1 to 20 mol %, preferably 1 to 10 mol % of primary amino functions (based on isocyanate functions in (a)),
with the proviso that the sum total of isocyanate-reactive groups in components (b), (c), (d), (f), (g), (h1), and (h2) gives 90 to 100 mol % of isocyanate-reactive groups, preferably 95 to 100 mol %, and more preferably 100 mol % (based on isocyanate functions in (a)).

The ratio here of (a1) to (a2) (based on the amount of isocyanate groups present therein) is from 4:1 to 1:4, preferably from 2:1 to 1:4, more preferably from 1:1 to 1:3, and very preferably from 1:2 to 1:3.

It may be sensible to use component (a) which comprises isocyanate groups, in other words the sum total of components (a1) and (a2), in excess, as for example add up to 120 mol %, preferably up to 115 mol %, and very preferably up to 110 mol %. This is especially preferred when at least one of the components employed, more particularly the hygroscopic compound (b), contains water which reacts with isocyanate functions in competition with hydroxyl functions.

The low molecular mass (meth)acrylate (B) is present in up to 3 times the amount by weight of the urethane (meth)acrylate (A), preferably in 0.1 to 2 times the amount, more preferably in 0.1 to 0.5 times the amount.

In accordance with the invention, for preparing the urethane (meth)acrylate (A), of the components (a) to (h1), at least the components (b) and (c), and also optionally (d), are introduced at least partly, preferably completely, and the isocyanate (a) is added to this mixture of the components introduced.

For this purpose it is preferred to introduce at least half of the planned amount for use of component (b), preferably at least 65%, more preferably at least 75%, and more particularly the entire amount.

Furthermore, it is preferred to introduce at least half the planned amount for use of component (c), preferably at least 65%, more preferably at least 75%, and more particularly the complete amount.

It is preferred to introduce at least half of the planned amount for use of component (d), preferably at least 65%, more preferably at least 75%, and more particularly the complete amount.

Added then to this mixture of components (b) and (c), and also, optionally, (d), is the isocyanate (a). This may be found continuously, in a plurality of portions, or in one addition.

Components (a1) and (a2) are preferably added at least partially, preferably completely, at the same time, in order to avoid domains with an increased fraction of (a1) or (a2) in the resultant polyurethane (A).

The reaction mixture is then interreacted at temperatures of 25 to 100° C., preferably 40 to 90° C., over a period of 3 to 20 hours, preferably at 5 to 12 hours, with stirring or circulatory pumping.

During the reactions, the temperature may stay the same or may be increased continuously or in steps.

Generally speaking, component (h1) is added when the components present in the reaction mixture have been substantially consumed by reaction—that is, for example, have undergone reaction to an extent of at least 50%, preferably at least 75%.

Where a component (h2) is provided for chain extension, it is preferably added when the residual NCO value of the reaction mixture has dropped below 1%. Reaction is then allowed to continue on for at least 15 minutes, preferably at least 30 minutes, and more preferably at least 45 minutes, at a temperature of 40 to 80° C.

The reaction is preferably accelerated by addition of a suitable catalyst. Such catalysts are known from the literature, as for example from G. Oertel (editor), Polyurethane, 3rd edition 1993, Carl Hanser Verlag, Munich—Vienna, pages 104 to 110, section 3.4.1. "Katalysatoren"; preferred are organic amines, more particularly tertiary aliphatic, cycloaliphatic, or aromatic amines, Brønsted acids and/or Lewis-acidic organometallic compounds, with Lewis-acidic organometallic compounds being particularly preferred. Preferably these are Lewis-acidic organometallic compounds, for which, for example, tin compounds are suitable, such as, for example, tin(II) salts of organic carboxylic acids, examples being tin(II) diacetate, tin(II) dioctoate, tin(II) bis(ethylhexanoate), and tin(II) dilaurate, and the dialkyltin(IV) salts of organic carboxylic acids, examples being dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate. It is possible, moreover, to use zinc(II) salts, such as zinc(II) dioctoate, for example.

Metal complexes are possible as well, such as acetylacetonates of iron, titanium, aluminum, zirconium, manganese, nickel, zinc, and cobalt.

Other metal catalysts are described by Blank et al. in Progress in Organic Coatings, 1999, vol. 35, pages 19-29.

Tin-free and zinc-free alternatives used include compounds of zirconium, of bismuth, of titanium, and of aluminum. These are, for example, zirconium tetraacetylacetonate (e.g., K-KAT® 4205 from King Industries), zirconium dionates (e.g., K-KAT® XC-9213, XC-A 209, and XC-6212 from King Industries), and aluminum dionate (e.g., K-KAT® 5218 from King Industries).

Zinc compounds and bismuth compounds that are contemplated include those employing the following anions: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$, and $(C_{n+1}H_{2n-2}O_4)^{2-}$, where n stands for the numbers 1 to 20. Preference here is given to the carboxylates in which the anion conforms to the formulae $(C_nH_{2n-1}O_2)^-$ and $(C_{n+1}H_{2n-2}O_4)^{2-}$ with n being 1 to 20. Particularly preferred salts have monocarboxylate anions of the general formula $(C_nH_{2n-1}O_2)^-$, where n stands for the numbers 1 to 20. Particularly noteworthy in this context are formate, acetate, propionate, hexanoate, neodecanoate, and 2-ethylhexanoate.

Among the zinc catalysts the zinc carboxylates are preferred, more preferably those of carboxylates which have at least six carbon atoms, very preferably at least eight carbon atoms, more particularly zinc(II) diacetate or zinc(II) dioctoate or zinc(II) neodecanoate. Commercially available catalysts are, for example, Borchi® Kat 22 from OMG Borchers GmbH, Langenfeld, Germany.

Among the bismuth catalysts the bismuth carboxylates are preferred, more preferably those of carboxylates which have at least six carbon atoms, more particularly bismuth octoates, ethylhexanoates, neodecanoates, or pivalates; examples include K-KAT 348, XC-B221, XC-C227, XC 8203, and XK-601 from King Industries, TIB KAT 716, 716LA, 716XLA, 718, 720, 789 from TIB Chemicals, and those from Shepherd Lausanne, and also, for example, Borchi® Kat 24, 315, and 320 from OMG Borchers GmbH, Langenfeld, Germany.

These may also be mixtures of different metals, as in Borchi® Kat 0245 from OMG Borchers GmbH, Langenfeld, Germany, for example.

Among the titanium compounds the titanium tetraalkoxide $Ti(OR)_4$ are preferred, more preferably those of alcohols ROH having 1 to 8 carbon atoms, examples being methanol, ethanol, isopropanol, n-propanol, n-butanol, isobutanol, sec-butanol, tert-butanol, n-hexanol, n-heptanol, and n-octanol, preferably methanol, ethanol, isopropanol, n-propanol, n-butanol, and tert-butanol, more preferably isopropanol and n-butanol.

These catalysts are suitable for solvent-based, water-based and/or blocked systems.

Molybdenum, tungsten, and vanadium catalysts are described in particular for the reaction of blocked polyisocyanates in WO 2004/076519 and WO 2004/076520.

Preferred Lewis-acidic organometallic compounds are dimethyltin diacetate, dibutyltin dibutyrate, dibutyltin bis(2-ethylhexanoate), dibutyltin dilaurate, dioctyltin dilaurate, zinc(II) dioctoate, zirconium acetylacetonate, zirconium 2,2, 6,6-tetramethyl-3,5-heptanedionate, and bismuth 2-ethylhexanoate.

Particularly preferred, however, are dibutyltin dilaurate, bismuth neodecanoate, and bismuth 2-ethylhexanoate; bismuth neodecanoate and bismuth 2-ethylhexanoate are especially preferred.

It is possible to boost the activity of the catalysts additionally through the presence of acids—by means, for example, of acids having a pKa of <2.5, as described in EP 2316867 A1, or having a pKa of between 2.8 and 4.5, as described in WO 04/029121 A1. The use is preferred of acids having a pKa of not more than 4.8, more preferably of not more than 2.5.

It is also conceivable to carry out the reaction without catalyst, though in that case the reaction mixture has to be exposed to relatively high temperatures and/or relatively long reaction times.

In order to prevent unwanted polymerization of the (meth) acrylate groups during the reaction, polymerization inhibitors may be added. Inhibitors of this kind are described for example in WO 03/035596, page 5, line 35 to page 10, line 4, to which reference may herewith be made in the context of the present disclosure content.

A preferred embodiment of the present invention may comprise the use of incorporable polymerization inhibitors, i.e., inhibitors which comprise an —OH or —NH$_2$ group— that is, an isocyanate-reactive group. One preferred example of such inhibitors is 4-hydroxy-2,2,6,6-tetramethylpiperidine-N-oxyl.

The reaction may be considered at an end when the NCO value has attained the theoretical conversion value of at least 95%, preferably at least 97%, and more preferably at least 98%.

Should unreacted isocyanate groups still be present, the reaction may be completed by reaction with the monoalcohol (f) under the above reaction conditions.

Following the preparation, the reaction mixture is dispersed or diluted in water.

The solids content usually set in this case is from 35% to 45%, though it may also be up to 60%.

The average particle size in the dispersion is generally 10 to 150 nm, preferably 15 to 120 nm, more preferably 20 to 100 nm, very preferably 20 to 90 nm.

The reaction may take place preferably in the presence of the low molecular mass (meth)acrylate (B), which not only functions as a solvent for the individual components and for the urethane (meth)acrylate (A) but is also a constituent of the coating material later on, at the application stage.

For this purpose, the entire amount of the compound (B) may be introduced at the beginning of the reaction, or may be added in the course of the reaction. It may, however, also be sensible not to add some of the low molecular mass (meth)acrylate (B) until after the reaction is ended, in order to carry out further dilution of the urethane (meth)acrylate (A).

It is preferred to use 30% to 100% of the total amount of low molecular mass (meth)acrylate (B) used at the actual reaction stage, more preferably 50% to 100%, very preferably 70% to 100%, and more particularly 100%. The remainder can then be added after the end of the reaction.

The urethane (meth)acrylate (A) obtained in accordance with the reaction regime of the invention, and optionally in solution in low molecular mass (meth)acrylate (B), may be employed with advantage as or in radiation-curable coating materials.

The amount of urethane (meth)acrylate (A) ought to be calculated such that the low molecular mass (meth)acrylate (B) present in the mixture is likewise dispersed.

These coating materials may comprise further constituents:

Where the coating materials are cured not with electron beams but instead by means of UV radiation, it is preferable to include at least one photoinitiator which is able to initiate the polymerization of ethylenically unsaturated double bonds.

Photoinitiators may be, for example, photoinitiators known to the skilled person, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds), SITA Technology Ltd, London.

Suitability is possessed, for example, by mono- or bisacylphosphine oxides, as described for example in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF AG), ethyl 2,4,6-trimethylbenzoylphenylphosphinate (Lucirin® TPO L from BASF AG), bis(2,4,6-trimethylbenzoyl)phenylphosphine oxide (Irgacure® 819 from Ciba Spezialitatenchemie), benzophenones, hydroxyacetophenones, phenylglyoxylic acid and its derivatives, or mixtures of these photoinitiators. Examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracene-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, and 2-amylanthraquinone, and 2,3-butanedione.

Also suitable are nonyellowing or low-yellowing photoinitiators of the phenylglyoxalic ester type, as described in DE-A 198 26 712, DE-A 199 13 353 or WO 98/33761.

Likewise conceivable as photoinitiators are polymeric photoinitiators, such as, for example, the diester of carboxymethoxybenzophenone with polytetramethylene glycols of varying molar weights, preferably 200 to 250 g/mol (CAS 515136-48-8), and also CAS 1246194-73-9, CAS 813452-37-8, CAS 71512-90-8, CAS 886463-10-1, or other polymeric benzophenone derivatives, of the kind available commercially, for example, under the trade name Omnipol® BP from Rahn AG, Switzerland.

One preferred embodiment uses silsesquioxane compounds as photoinitiators having at least one group with initiating activity, of the kind described in WO 2010/063612 A1, especially from page 2, line 21 to page 43, line 9 therein, hereby incorporated by reference as part of the present disclosure content, preferably from page 2, line 21 to page 30, line 5, and also the compounds described in the examples of WO 2010/063612 A1.

Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-trimethylbenzophenone, and 4-methylbenzophenone and 2,4,6-trimethylbenzoyldiphenylphosphine oxide.

Preference among these photoinitiators is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

The coating materials comprise the photoinitiators preferably in an amount of 0.05 to 10 wt %, more preferably 0.1 to 8 wt %, in particular 0.2 to 5 wt %, based on the total amount of the urethane (meth)acrylate (A).

The coating materials may comprise further customary coatings additives, such as flow control agents, defoamers, UV absorbers, dyes, pigments and/or fillers.

Suitable fillers comprise silicates, e.g., silicates obtainable by hydrolysis of silicon tetrachloride, such as Aerosil® from Degussa, siliceous earth, talc, aluminum silicates, magnesium silicates, and calcium carbonates, etc. Suitable stabilizers comprise typical UV absorbers such as oxanilides, triazines, and benzotriazole (the latter obtainable as Tinuvin® grades from Ciba-Spezialitatenchemie, now BASF), and benzophenones. They can be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate. Stabilizers are used usually in amounts of 0.1 to 5.0 wt %, based on the "solid" components comprised in the preparation.

The dispersions of the invention are particularly suitable as coating material or in coating materials, more preferably for coating substrates such as wood, paper, textile, leather, nonwoven, plastics surfaces, glass, ceramic, mineral building materials, such as cement moldings and fiber-cement slabs, and, in particular, for coating metals or coated metals.

The dispersions of the invention can be used with particular advantage for coating wood and wood materials and wood-containing substrates, such as fiberboard. Also conceivable would be the coating of substrates containing cellulose fiber, such as paper, paperboard or cardboard, for example. With very particular preference the dispersions are suitable for the coating of oak, spruce, pine, beech, maple, walnut, macoré, chestnut, plane, robinia, ash, birch, stone pine, and elm, and also cork.

The substrates are coated in accordance with customary methods that are known to the skilled person, involving the application of at least one coating material to the substrate that is to be coated, in the desired thickness, and removal of the volatile constituents of the coating materials. This process can be repeated one or more times if desired. Application to the substrate may take place in a known way, e.g., by spraying, troweling, knifecoating, brushing, rolling, rollercoating or pouring. The coating thickness is generally situated within a range from about 3 to 400 g/m², preferably 10 to 200 g/m², and more preferably 10 to 80 g/m².

Optionally, if two or more films of the coating material are applied one on top of another, a radiation cure and intermediate sanding may take place after each coating operation.

Radiation curing is accomplished by exposure to high-energy radiation, i.e., UV radiation or daylight, preferably light with a wavelength of 250 to 600 nm, or by irradiation with high-energy electrons (electron beams; 150 to 300 keV). Examples of radiation sources used include high-pressure mercury vapor lamps, lasers, pulsed lamps (flashlight), halogen lamps or excimer emitters. The radiation dose normally sufficient for crosslinking in the case of UV curing is situated within the range from 80 to 3000 mJ/cm². Preference is given to low-pressure mercury lamps, medium-pressure lamps with high-pressure lamps, which may optionally have been doped with gallium or iron, and also, furthermore, to LED lamps.

Irradiation may also, optionally, be carried out in the absence of oxygen, e.g., under an inert gas atmosphere. Suitable inert gases include, preferably, nitrogen, noble gases, carbon dioxide or combustion gases. Irradiation may also take place with the coating material being covered by transparent media. Transparent media are, for example, polymeric films, glass or liquids, e.g., water. Particular preference is given to irradiation in the manner as is described in DE-A1 199 57 900.

In one preferred process, curing takes place continuously, by passing the substrate treated with the coating material at constant speed past a radiation source. For this it is necessary for the cure rate of the coating material to be sufficiently high.

This varied course of curing over time can be exploited in particular when the coating of the article is followed by a further processing step in which the film surface comes into direct contact with another article or is worked on mechanically.

The advantage of the coating materials is that the coated wood substrates exhibit good wet transparency and high grain highlighting. At the same time, on drying at elevated temperature, a very smooth surface can be obtained. The films exhibit high fullness and optical transparence.

The invention is illustrated by means of the following nonlimiting examples.

EXAMPLES

Comparative Example 1

In a stirred tank, 34 parts of 2-hydroxyethyl acrylate, 73 parts of Lupraphen® VP 9184 (polyesterdiol synthesized from adipic acid, isophthalic acid, and hexanediol, having an OH number of 112 mg KOH/g); 294 parts of Laromer® LR8986 (epoxy acrylate having an average OH number of 214 mg KOH/g and a double bond density of 3.8 mol/kg); 28 parts of dimethylolpropionic acid, 24 parts of 1,4-butanediol, 35 parts of Pluriol® A500E (methyl-capped monofunctional polyethylene glycol having an OH number of 110 mg KOH/g), 188 parts of Basonat® I (isophorone diisocyanate with an NCO equivalent weight of 111 g/mol), 66 parts of Basonat® HI 100 (hexamethylene diisocyanate-based polyisocyanate having an average functionality of 3 and an NCO equivalent weight of 190 g/mol), 25 parts of HDI (hexamethylene diisocyanate with an NCO equivalent weight of 84 g/mol), 0.4 part of 2,6 di-tert-butyl-p-cresol, 0.2 part of 4-hydroxy-Tempo, and 135 parts of acetone were introduced as an initial charge and at room temperature 0.5 part of BorchiKat® 24 (bismuth carboxylate) was added. The mixture was heated to 80° C. and allowed to react at 80° C. for 8 hours. The NCO value was 0.65%, before the reaction mixture was diluted with 200 parts of acetone. 17 parts of triethylamine were added. Over 30 minutes, the batch was made up with 1200 parts of DI water (deionized water) and the acetone was removed by distillation under reduced pressure. The solids content of the dispersion was adjusted to 41%. The viscosity of the slightly bluish dispersion was 26 mPa s, with an average particle size of 92 nm.

Comparative Example 2

The procedure of comparative example 1 was repeated, but the resulting NCO value of 0.57% was stopped, after dilution with acetone, using 5 parts of dibutylamine and 7.5 parts of isophoronediamine. Following neutralization with 17 parts of triethylamine, the batch was made up with 1200 parts of DI water and the acetone was removed by distillation under reduced pressure. This gave a dispersion having a solids content of 39.1%, a viscosity of 72 mPa s, and an average particle size of 89 nm.

Comparative Example 3

In a 2 l flask equipped with reflux condenser, stirrer, dropping funnel, and thermometer, 427.1 g of a 45:55 mixture (w/w) of fully acrylicized bisphenol A diacrylate and trimethylolpropane, each with 3.2-fold ethoxylation on average, 10.6 g of ethylene glycol, 50.2 g of dimethylolpropionic acid, 0.149 g of 4-hydroxy-2,2,6,6-tetramethylpiperidine-1-oxyl, 0.373 g of diphenylethene, and 222.9 g of acetone were introduced as an initial charge at 60[deg.]C. and heated to reflux. The catalyst added to the thoroughly mixed initial charge was 0.72 g of Borchi® Kat 24 (bismuth carboxylate, OMG Borchers GmbH, Langenfeld). Added dropwise to this mixture over the course of 60 minutes at 60 to 70[deg.]C., simultaneously and in portions, were 101.7 g of isophorone diisocyanate and 126.5 g of hexamethylene diisocyanate. The reaction mixture was stirred at reflux temperature until the NCO value of the reaction mixture was 0.42%, and a further 179 g of acetone were added. This was followed by cooling to 40[deg.]C. and neutralization with 102 g of 10% strength aqueous sodium hydroxide solution. After cooling to ambient temperature, the polyurethane solution was introduced with vigorous stirring into 800 g of water, with a dispersion forming spontaneously. The acetone was then removed by distillation under reduced pressure at 40[deg.]C., and the dispersion, finally, was adjusted to the desired solids content by dilution with 300 g of water. The solids content was 41%. The particle size was 73 nm, the viscosity 57 mPa s, and the pH 7.9.

Preparation of an Inventive Polyurethane Acrylate Dispersion

Inventive Example 1

The procedure of comparative example 1 was repeated, but the resulting NCO value of 0.63% was stopped, after dilution with acetone, using 36 parts of ditridecylamine and 7.5 parts of isophoronediamine. Following neutralization with 17 parts of triethylamine, the batch was made up with 1250 parts of DI water and the acetone was removed by distillation under reduced pressure. This gave a dispersion having a solids content of 39.5%, a viscosity of 58 mPa s, and an average particle size of 99 nm.

Inventive Example 2

The procedure of comparative example 1 was repeated, but the resulting NCO value of 0.56% was stopped, after dilution with acetone, using 14 parts of ditridecylamine and 7 parts of isophoronediamine. Following neutralization with 17 parts of triethylamine, the batch was made up with 1200 parts of DI water and the acetone was removed by distillation under reduced pressure. This gave a dispersion having a solids content of 39.9%, a viscosity of 440 mPa s, and an average particle size of 54 nm.

Inventive Example 3

The procedure of comparative example 1 was repeated, but the resulting NCO value of 0.59% was stopped, after dilution with acetone, using 14 parts of ditridecylamine and 8 parts of isophoronediamine. Following neutralization with 55 parts of 10% strength aqueous sodium hydroxide solution, the batch was made up with 1200 parts of DI water and the acetone was removed by distillation under reduced pressure. This gave a dispersion having a solids content of 39.9%, a viscosity of 92 mPa s, and an average particle size of 75 nm.

Production of Films

The dispersions or solutions from inventive examples 1 to 7, and from comparative examples 1 to 3 were admixed with 4% by weight of Irgacure® 500 photoinitiator (mixture of 50 wt % 1-hydroxycyclohexyl phenol ketone and 50 wt % benzophenone, BASF SE, formerly Ciba Spezialitatenchemie) and applied to a pre-sanded wood substrate, using a 200 μm four-way bar applicator.

The coated substrate was flashed at room temperature for 15 minutes and at 60° C. in a forced-air oven for 30 minutes, and irradiated in an IST UV unit, on a conveyer belt at 10 m/min with 2 UV lamps (120 W/cm, medium-pressure mercury lamps). It was then re-sanded (160 grade) and subsequently coated again (as above), dried and UV cured. The films were through-cured (fingernail test), and exhibit low pendulum damping.

|  | Comparative example 1 | Comparative example 2 | Comparative example 3 |
|---|---|---|---|
| Solids content 1) | 41 wt % | 39.1 wt % | 41.0 wt % |
| Viscosity 2) | 26 mPas | 72 mPas | 57 mPas |
| pH | 7.7 | 7.6 | 7.9 |
| Appearance | milky, white | milky, white | translucent |
| Particle size 3) | 92 nm | 89 nm | 73 nm |
| Glass transition temperature onset 4) | −9.6° C. (a bit sticky, −3) | −2.9° C. (sticky, −4) | (minimal stickiness, −1) |
| Glass transition temperature offset 4) | 19.4° C. | 27.3° C. | n.d.* |
| Roughness after heating; $R_a/R_q$ 5) | 406 nm/547 nm very severe orange peel | 529 nm/682 nm very severe orange peel | 174 nm/303 nm good filming/ smooth surface |
| Grain highlighting 6) | 0 | 1.5 | 4 |
| Pendulum hardness after UV curing 7) | 114 | 104 | 120 |
| Pendulum hardness before UV curing 7) | 0 | 2 | 6 |
| Appearance 8) | 2 | 3 | 3 |
| Chem. test | 4.9 | n.d.* | 5.0 |

|  | Inventive example 1 | Inventive example 2 | Inventive example 3 |
|---|---|---|---|
| Solids content 1) | 39.5 wt % | 39.9 wt % | 39.9 wt % |
| Viscosity 2) | 58 mPas | 440 mPas | 92 mPas |
| pH | 7.9 | 8.0 | 7.8 |
| Appearance | milky, white | translucent - transparent | translucent |

-continued

| | | | |
|---|---|---|---|
| Particle size 3) | 99 nm | 54 nm | 75 nm |
| Glass transition temperature onset 4) | −9.7° C. (sticky, 4) | −6.3° C. (minimal stickiness/ slight, 1-2) | −1.2° C. (minimal stickiness/ slight 1-2) |
| Glass transition temperature offset 4) | 19.3° C. | 22.9° C. | 28.8° C. |
| Roughness after heating, $R_a/R_q$ 5) | 213 nm/320 nm very slight structure | 381 nm/528 nm slight structure | 246 nm/331 nm very slight structure/ virtually smooth surface |
| Grain highlighting 6) | 1.5 | 1.5 | 1.5-2.0 |
| Pendulum hardness after UV curing 7) | 99 | 115 | 124 |
| Pendulum hardness before UV curing 7) | 0 | 0 | 2 |
| Appearance 8) | 1 | 1 | 1 |
| Chem. test | n.d.* | 5.0 | 5.0 |

1) According to DIN EN ISO 3251 (1 g at 125° C.)
2) Rotary viscometer 23° C. at 50 s⁻¹ [mPas]
3) Average particle size from Malvern ® Zetasizer 1000, Malvern Instruments, Malvern, UK
4) Glass transition temperature of the pure binder, measured using a Netzsch DSC 204 F1 with CC 200 F1 controller, temperature range from −20 to 150° C. with 20 K/min heating rate
5) Measurement of surface roughness (white light interferometry)
6) Film drawdown on beech, visual assessment according to ratings, rating 1 = best result, rating 4 = worst result. The benchmark was a 40% UV formulation based on polyurethane acrylate dispersion (Laromer ® LR 8949) with good grain highlighting: rating 1).
7) Pendulum hardness by König method DIN 53157 (swings) before and after UV curing; before UV: after 24 h at RT; after UV: after 24 h at RT and subsequent curing with an IST UV system on a conveyor belt at 10 m/min with 2 UV lamps (120 W/cm, medium-pressure mercury lamps) - 2 passes.
8) Optical transparency and appearance of the varnish on beech (visual assessment according to ratings, rating 1 = best result, rating 4 = worst result)
9) Chemicals resistance to DIN EN 12720. Chemicals determined were: water (24 h), coffee (16 h, 6 h, 1 h), ethanol, 48%, in water (6 h, 1 h), liquid paraffin (24 h). Rating 5 = best result, rating 1 = worst result. The figure stated is the average value from all of the 7 measurements in each case.
10) Stickiness/cotton wool test: Applied dispersion at 200 μm wet and heated at 60° C. for 20 minutes. After cooling, flash off at room temperature for about 15 minutes, and finally, pass cotton wool gently over the film, and assess.
Assessment:
5 = very sever sticking, no pendulum damping
4 = sticky/blocks in pendulum damping apparatus
3 = a bit sticky
2 = slight
1 = minimal
0 = tack-free
*n.d. = not determined

The invention claimed is:

1. A urethane (meth)acrylate (A) comprising a reaction product of:
(a) at least one (cyclo)aliphatic di- and/or polyisocyanate,
(b1) at least one (cyclo)aliphatic diol having a molar mass of less than 700 g/mol,
(b2) at least one polyesterdiol having a weight-average molar mass Mw of 700 to 2000 and optionally an acid number to DIN 53240 of not more than 20 mg KOH/g,
(c) at least one compound (c) having at least one isocyanate-reactive group and at least one radically polymerizable unsaturated group,
(d) at least one compound which has at least one isocyanate-reactive group and at least one acid group,
(e) at least one base for at least partial neutralization of at least one acid group of component (d), being different from components (h1) and (h2),
(f) optionally at least one monoalcohol, having precisely one hydroxyl function,
(g) optionally at least one monofunctional polyalkylene oxide polyether alcohol,
(h1) at least one monoamine which is substituted by one or two hydrocarbon radicals, in which the one or two hydrocarbon radicals together have at least 12 carbon atoms, and
(h2) optionally at least one compound having at least two primary and/or secondary amino groups,
wherein the urethane (meth)acrylate (A) is obtained by a process comprising reacting at least a portion of components (b1), (b2), and (c) with component (a).

2. The urethane (meth)acrylate according to claim 1, wherein component (a) is a mixture of an aliphatic di- and/or polyisocyanate (a1) and a cycloaliphatic di- and/or polyisocyanate (a2).

3. The urethane (meth)acrylate according to claim 1, wherein component (b1) is at least one selected from the group consisting of ethylene glycol, 1,2-propanediol, 1,3-propanediol, 2,2-dimethyl-1,2-ethanediol, 2,2-dimethyl-1,3-propanediol (neopentyl glycol), 1,2-butanediol, 1,3-butanediol, 1,4-butanediol, 1,6-hexanediol, and diethylene glycol.

4. The urethane (meth)acrylate according to claim 1, wherein component (b2) is a polyesterdiol synthesized at least partly from aliphatic diol and/or dicarboxylic acid building blocks.

5. The urethane (meth)acrylate according to claim 1, wherein component (c) is at least one selected from the group consisting of 2-hydroxyethyl acrylate, 2-hydroxyethyl methacrylate, 2- or 3-hydroxypropyl acrylate, 1,4-butanediol monoacrylate, glyceryl 1,2- or 1,3-diacrylate, trimethylolpropane diacrylate, pentaerythrityl triacrylate, ditrimethylolpropane triacrylate, and dipentaerythrityl pentaacrylate.

6. The urethane (meth)acrylate according to claim 1, wherein compound (c) is an epoxy (meth)acrylate of the formula:

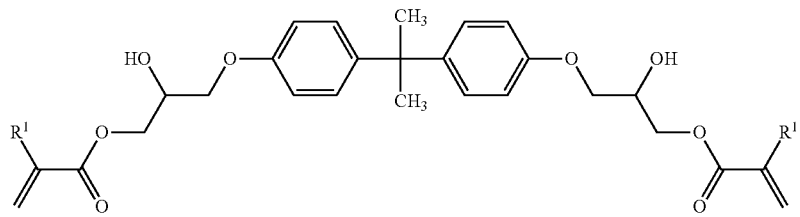

where
$R^1$ is hydrogen or methyl.

7. The urethane (meth)acrylate according to claim 1, wherein component (d) is at least one selected from the group consisting of dimethylolpropionic acid and dimethylolbutyric acid.

8. The urethane (meth)acrylate according to claim 1, wherein
the one or two hydrocarbon radicals of the compound (h1) are one or two alkyl radicals, and
both alkyl radicals each independently of one another comprise at least six carbon atoms.

9. The urethane (meth)acrylate (A) according to claim 1, comprising a reaction product of
(a) at least one (cyclo)aliphatic di- and/or polyisocyanate,
(b1) at least one (cyclo)aliphatic diol having a molar mass of less than 700 g/mol,
(b2) at least one polyesterdiol having a weight-average molar mass Mw of 700 to 2000 and optionally an acid number to DIN 53240 of not more than 20 mg KOH/g,
(c) at least one compound (c) having at least one isocyanate-reactive group and at least one radically polymerizable unsaturated group,
(d) at least one compound which has at least one isocyanate-reactive group and at least one acid group,
(e) at least one base for at least partial neutralization of at least one acid group of component (d), being different from components (h1) and (h2),
(f) at least one monoalcohol, having precisely one hydroxyl function,
(g) at least one monofunctional polyalkylene oxide polyether alcohol,
(h1) at least one monoamine which is substituted by one or two hydrocarbon radicals, in which the one or two hydrocarbon radicals together have at least 12 carbon atoms, and
(h2) at least one compound having at least two primary and/or secondary amino groups.

10. The urethane (meth)acrylate (A) of claim 1, obtained by a process that comprises reacting at least a portion of components (b1), (b2), and (c) with component (a) to obtain a reaction mixture, and then, after the reacting substantially consumes components of the reaction mixture, adding component (h1).

11. A coating material, comprising:
the urethane (meth)acrylate according to claim 1.

12. A coating material comprising:
the urethane (meth)acrylate according to claim 1 and
a (meth)acrylate (B) which has at least two (meth)acrylate functions and an average molecular weight of up to 1000 g/mol.

13. The coating material according to claim 12, wherein the (meth)acrylate (B) is a compound of the formula (VIIIa) to (VIIId):

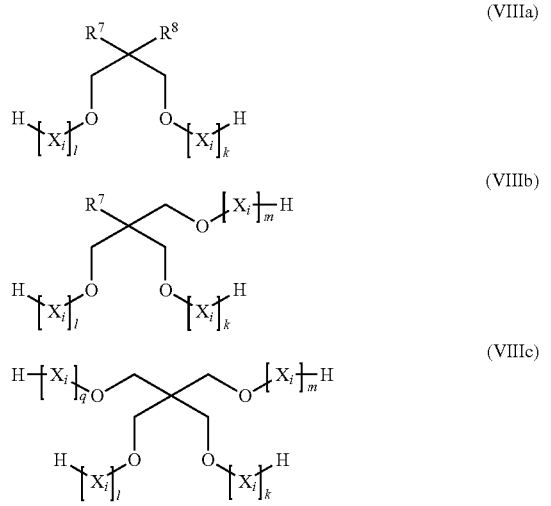

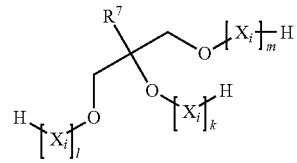

where
$R^7$ and $R^8$ independently of one another are hydrogen or optionally aryl-, alkyl-, aryloxy-, alkyloxy-, heteroatom- and/or heterocycle-substituted $C_1$-$C_{18}$ alkyl,
k, l, m, q independently of one another are each an integer from 1 to 10, and
each $X_i$ for i=1 to k, 1 to l, 1 to m, and 1 to q is optionally selected independently of one another from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O—, and —CHPh-$CH_2$—O—,
where Ph is phenyl and Vin is vinyl.

14. A substrate coated with the coating material according to claim 12.

15. A method for coating a substrate, the method comprising:
applying the coating material of claim 12 to the substrate, thereby producing an applied substrate,
drying the applied substrate, thereby producing a dried substrate and
radiation-curing the dried product.

16. A substrate coated with the urethane (meth)acrylate according to claim 1.

17. The substrate according to claim 16, comprising: coated oak, spruce, pine, beech, maple, chestnut, plane, robinia, ash, birch, stone pine, elm, walnut, or macore.

18. The substrate according to claim 16 coated with the urethane (meth)acrylate, wherein the substrate is wood, paper, textile, leather, nonwoven, plastics surfaces, glass, ceramic, mineral building materials, metals, coated metals, paper, paperboard, or cardboard.

19. The substrate according to claim 16 coated with the urethane (meth)acrylate, wherein the substrate is oak, spruce, pine, beech, maple, chestnut, plane, robinia, ash, birch, stone pine, elm, walnut, macore, or cork.

20. A method for coating a substrate, the method comprising:
applying the urethane (meth)acrylate according to claim 1 to the substrate, thereby producing an applied substrate,
drying the applied substrate, thereby producing a dried substrate and
radiation-curing the dried product.

21. The method according to claim 20, wherein the substrate comprises: coated oak, spruce, pine, beech, maple, chestnut, plane, robinia, ash, birch, stone pine, elm, walnut, or macore.

* * * * *